US005675814A

United States Patent [19]

Pearce

[11] Patent Number: 5,675,814
[45] Date of Patent: Oct. 7, 1997

[54] APPARATUS AND METHOD FOR MANAGING POWER CONSUMPTION BY I/O PORTS IN A COMPUTER SYSTEM

[75] Inventor: John J. Pearce, Austin, Tex.

[73] Assignee: Dell USA, L.P., Round Rock, Tex.

[21] Appl. No.: 591,850

[22] Filed: Jan. 26, 1996

[51] Int. Cl.$^6$ .............................. G06F 13/00; G06F 9/46
[52] U.S. Cl. .......................... 395/750; 395/835; 395/837; 395/838; 395/500
[58] Field of Search ................................... 395/750, 838, 395/835, 837, 500

[56] References Cited

U.S. PATENT DOCUMENTS 5,590,312  12/1996  Marisetty .

Primary Examiner—Jack B. Harvey
Assistant Examiner—Rupal Devendra Dharia
Attorney, Agent, or Firm—Mark P. Kahler; Henry N. Garrana; Diana L. Roberts

[57] ABSTRACT

A portable computer is provided in which the consumption of power by the I/O ports of the computer is reduced. The processor of the computer distinguishes port I/O operations that require an actual data transfer from port I/O operations that do not require an actual data transfer. The I/O ports of the computer remain off until an I/O operation involving an actual data transfer at a particular port is required. When an I/O operation which requires an actual data transfer is encountered, then the appropriate port is powered up. In this manner, power consumption by the I/O ports of the computer is significantly reduced. Advantageously, the disclosed technique for reducing power consumption by the I/O ports of the computer is operating system independent. In this manner, the power management feature functions regardless of which particular operating system or application software is installed on the computer.

33 Claims, 3 Drawing Sheets

APPARATUS AND METHOD FOR MANAGING POWER CONSUMPTION BY I/O PORTS IN A COMPUTER SYSTEM

BACKGROUND OF THE INVENTION

1. Field of the Invention

This invention relates in general to computer systems and, more particularly, to power conservation apparatus and techniques employed in personal computer systems.

2. Description of Related Art

Personal computer systems in general and IBM compatible personal computer systems in particular have attained widespread use. These personal computer systems now provide computing power to many segments of today's modern society. A personal computer system can usually be defined as a desktop, floor-standing, or portable microcomputer that includes a system unit having a system processor with associated volatile and non-volatile memory, a display monitor, a keyboard, one or more floppy diskette drives, a hard disk storage device, an optional CD-ROM drive and an optional printer. One of the distinguishing characteristics of these systems is the use of a system board or motherboard to electrically connect these components together. These personal computer systems are information handling systems which are designed primarily to give independent computing power to a single user (or a relatively small group of users in the case of personal computers which serve as server systems). Such personal computer systems are generally inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. These I/O devices are typically plugged into I/O ports of the computer system such as serial ports and parallel ports, for example.

Personal computer systems typically include basic input/output system (BIOS) microcode to make programmer/user interaction with the system hardware easier. More specifically, BIOS is a microcode software interface between the system hardware and the operating system/application program. The operating system and application program access BIOS rather than directly manipulating I/O ports, registers and control words of the specific system hardware. BIOS is accessed through an interface of software interrupts and contains a plurality of entry points corresponding respectively to the different interrupts. In operation, BIOS is typically loaded from a BIOS ROM in which it is stored to a main system memory from which it is executed. This practice is referred to as "shadow RAM" and increases the perceived speed at which BIOS executes.

Since portable personal computers are powered by batteries with limited battery life, it is important to minimize power consumption by the computer as much as possible. One technique for power conservation involves shutting down parts of the computer which are not being used. For example, if the display screen has not been used for more than a predetermined period of time, the display screen is switched to a lower power "standby" state to conserve energy. Similarly, if the hard disk storage media of the computer has not been accessed for more than a predetermined period of time, the hard disk is switched to a lower power "standby" state to conserve energy.

As mentioned briefly earlier, portable computers typically include input/output (I/O) ports such as serial ports and parallel ports. These ports are initialized regardless of whether I/O devices such as modems, printers, etc. are coupled thereto. Once these ports are initialized, the ports are powered-up and draw significant power even when I/O devices are not connected to such ports. For example, even though the user of the portable computer may not have a printer coupled to the parallel port of the portable computer, once the parallel port is initialized, power is nevertheless consumed by the parallel port.

SUMMARY OF THE INVENTION

A computer with improved power management was discovered in which I/O operations that require an actual data transfer are distinguished from I/O operations that do not require an actual data transfer. The I/O ports of the computer remain off until an I/O operation involving an actual data transfer at a particular port is required. When an I/O operation which requires an actual data transfer is encountered, then the appropriate port is powered up. In this manner, power consumption by the I/O ports of the computer is significantly reduced. Advantageously, the disclosed technique for reducing power consumption by the I/O ports of the computer is operating system independent. In this manner, the power management feature functions regardless of which particular operating system or application software is installed on the computer.

More particularly, one embodiment of the computer system is disclosed which includes an I/O port and a processor which is coupled to the I/O port. The processor executes instructions in an instruction stream provided to the processor. The processor traps I/O operations to the port to produce trapped I/O operations. The computer system further includes a memory which is coupled to the processor. The memory includes code which when executed by the processor leaves the I/O port in a powered-off state until a trapped I/O operation involving actual data transfer through the I/O port is executed by the processor.

In another embodiment of the computer system, the computer system includes an I/O port and a processor which is coupled to the I/O port. The processor executes instructions in an instruction stream provided to the processor. The processor traps I/O operations to the port to produce trapped I/O operations. The computer system includes a main memory which is coupled to the processor. The main memory includes a system management mode (SMM) memory which stores SMM code for checking trapped I/O operations to determine the types of the trapped I/O operations. The SMM code includes a first module for saving initialization parameters for the I/O port to the system management mode (SMM) memory as stored initialization parameters if the I/O type of a trapped I/O operation is a port initialization. The SMM code further includes a second module for emulating a trapped I/O operation if the I/O type of the trapped I/O operation is a type without data transfer through the port. The I/O port remains in the off state during the emulating of the trapped I/O operation. The SMM code further includes a third module for turning the I/O port on to a powered-up state if the I/O type of the trapped I/O operation is a type with data transfer through the port.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
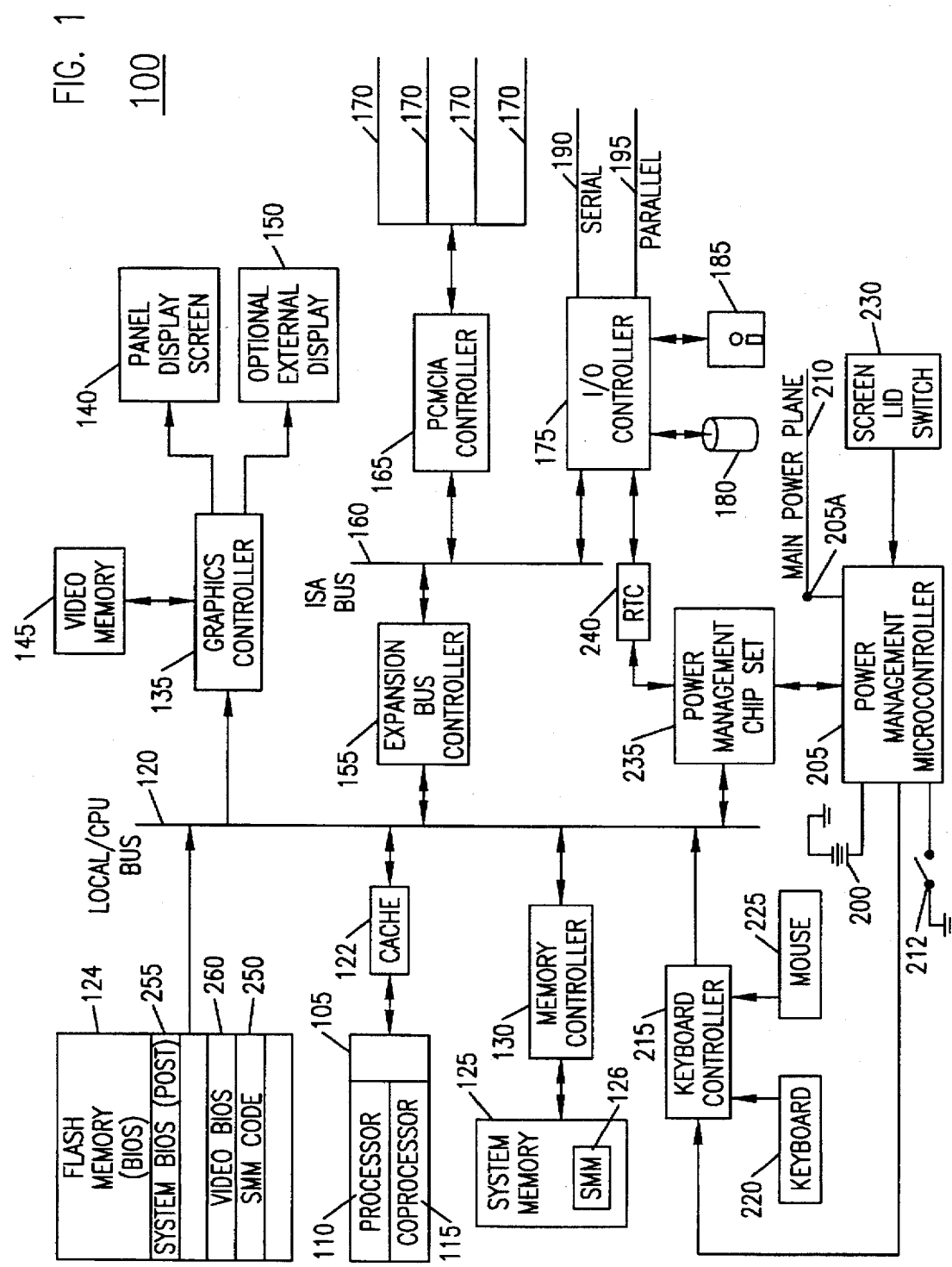
FIG. 1 is a block diagram of the disclosed computer system.

FIG. 1 is a block diagram of a computer 100 which manages I/O port power consumption to conserve power drawn from battery 200. Before discussing the power management aspects of computer 100, the components of the computer are first discussed in general. Computer 100 includes a microprocessor 105 having a processor 110 for handling integer operations and a coprocessor 115 for handling floating point operations. Microprocessor 105 is coupled to a local bus 120 via cache 122. A main memory 125 of dynamic random access memory (DRAM) modules is coupled to local bus 120 by a memory controller 130. Main memory 125 includes a system management mode (SMM) memory area which is employed to store I/O port parameters as will be discussed in more detail subsequently.

A Basic Input Output System (BIOS) memory 124 is coupled to local bus 120. A FLASH memory or other nonvolatile memory is used as BIOS memory 124. BIOS memory 124 stores the system microcode which controls the operation of computer 100. More particularly, BIOS ROM 124 stores software or code which implements the later described power conservation technique.

A graphics controller 135 is coupled to local bus 120 and to a panel display screen 140. Graphics controller 135 is also coupled to a video memory 145 which stores information to be displayed on panel display 140. Panel display 140 is typically an active matrix or passive matrix liquid crystal display (LCD) although other display technologies may be used as well. Graphics controller 135 can also be coupled to an optional external display or standalone monitor display 150 as shown in FIG. 1. One graphics controller that can be employed as graphics controller 135 is the Western Digital WD90C24A graphics controller.

A bus interface controller or expansion bus controller 155 couples local bus 120 to an expansion bus 160. In this particular embodiment, expansion bus 160 is an Industry Standard Architecture (ISA) bus although other buses such as a Peripheral Component Interconnect (PCI) bus, for example, could also be used. A PCMCIA (Personal Computer Memory Card International Association) controller 165 is also coupled to expansion bus 160 as shown. PCMCIA controller 165 is coupled to a plurality of expansion slots 170 to receive PCMCIA expansion cards such as modems, fax cards, communications cards and other input/output devices.

An I/O controller 175 referred to as a super I/O controller is coupled to ISA bus 160 as shown in FIG. 1. I/O controller 175 interfaces to both an integrated drive electronics (IDE) hard drive 180 and a floppy drive 185. I/O controller 175 also provides a serial port 190 and a parallel port 195 to which peripheral devices can be coupled.

Computer 100 includes a battery 200 which provides power to the many devices which form computer 100. Battery 200 is typically a rechargeable battery such as a nickel metal hydride (NiMH) or lithium ion battery, for example. Battery 200 is coupled to a power management microcontroller 205 which controls the distribution of power from battery 200. More specifically, microcontroller 205 includes a power output 205A coupled to the main power plane 210 which supplies power to microprocessor 105. Power microcontroller 205 is also coupled to a power plane (not shown) which supplies power to panel display 140. In this particular embodiment, power control microcontroller 205 is a Motorola 6805 microcontroller. Microcontroller 205 monitors the charge level of battery 200 to determine when to charge and when not to charge battery 200. Microcontroller 205 is coupled to a main power switch 212 which the user actuates to turn the computer on and off. While microcontroller 205 powers down other portions of computer system 100 such as hard drive 180 when not in use to conserve power, microcontroller 205 itself is always coupled to a source of energy, namely battery 200.

Power management microcontroller 205 is also coupled to a keyboard controller 215 which is coupled to local bus 120. A keyboard 220 and mouse 225 are coupled to keyboard controller 215 so that user input can be provided to portable computer 100. One microcontroller that can be used as keyboard controller 215 is the model 8051 microcontroller manufactured by Intel.

Portable computer 100 includes a screen lid switch 230 or indicator 230 which provides an indication of when panel display 140 is in the open position and an indication of when panel display 140 is in the closed position. It is noted that panel display 140 is generally located in the same location in the lid of the computer as is typical for "clamshell" types of portable computers such as laptop or notebook computers. In this manner, the display screen forms an integral part of the lid of the computer which swings from an open position for interaction with the user to a close position.

Portable computer 100 also includes a power management chip set 235 which includes power management chip models WD8110 and WD76C25 manufactured by Western Digital. Power management chip set 235 is coupled to microprocessor 105 via local bus 120 so that power management chip set 235 can receive power control commands from microprocessor 105. Power management chip set 235 is connected to a plurality of individual power planes which supply power to respective devices in computer 100 such as hard drive 180 and floppy drive 185, for example. In this manner, power management chip set 235 acts under the direction of microprocessor 105 to control the power to the various power planes and devices of the computer. A real time clock (RTC) 240 is coupled to I/O controller 175 and power management chip set 235 such that time events or alarms can be transmitted to power management chip set 235. Real time clock 240 can be programmed to generate an alarm signal at a predetermined time.

Figure 2:
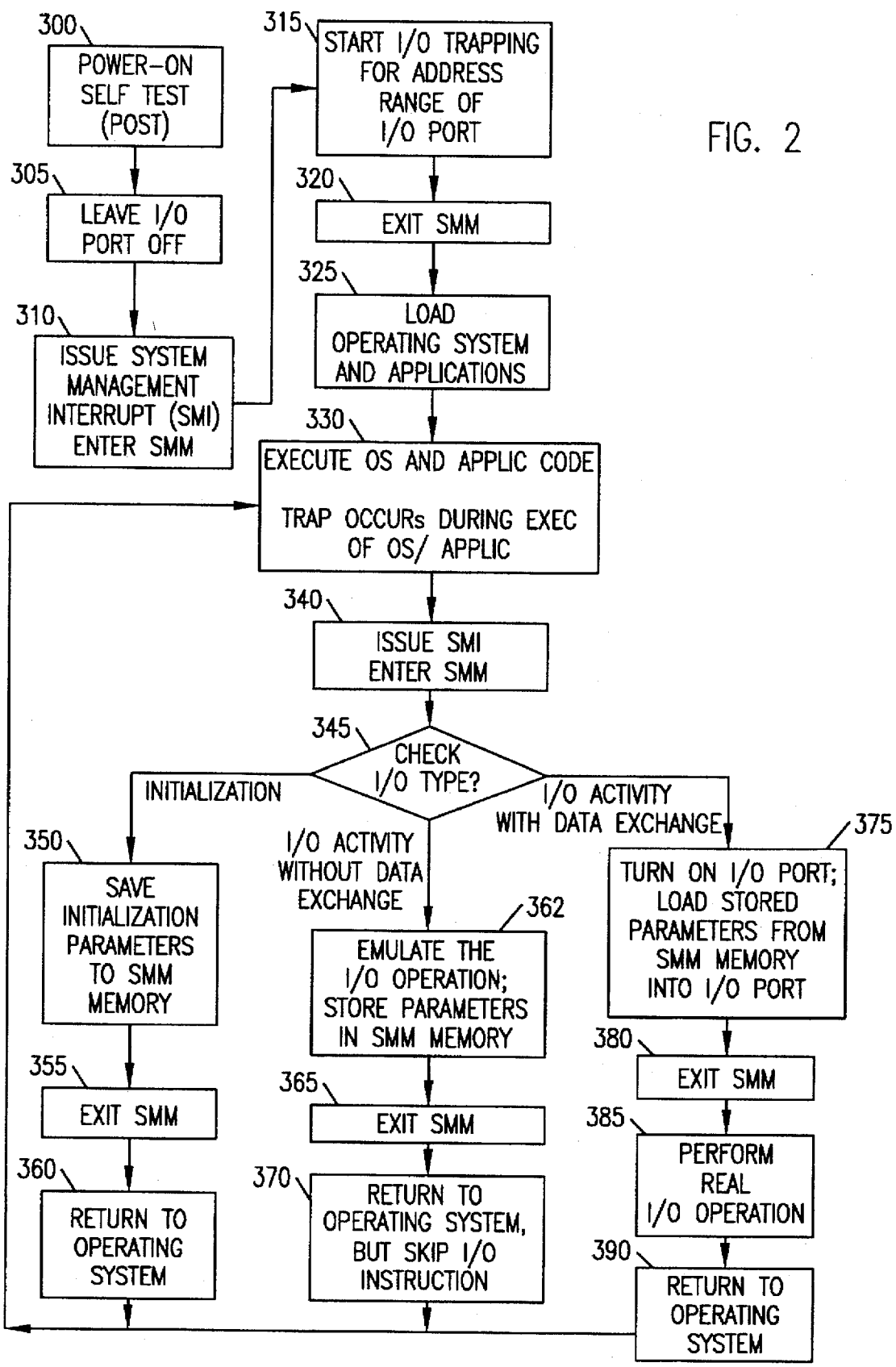
FIG. 2 is a flow chart depicting the process flow of the I/O port power management methodology employed in the computer system of FIG. 1.

The power savings achieved by the embodiment of the invention depicted in FIG. 1 are made possible by systems management mode (SMM) code 250 which is stored in BIOS memory 124. It is noted that along with SMM code 250, also stored in BIOS memory 124 are the system BIOS 255 (including a power on self test module-POST) and video BIOS 260. When computer 100 boots after being turned on, the sequence of events depicted in the flow chart of FIG. 2 is followed. This sequence of events is implemented by the SMM code software 250 which is executed by microprocessor 105 as now discussed in more detail.

When computer 100 is turned on, the system BIOS software stored in BIOS memory 124 is copied into system memory 125 so that it can be executed more quickly. This technique is referred to as "shadow RAM". At this time, SMM code 250 is copied into the system management mode memory area 126 of memory 125. SMM code 250 executes whenever microprocessor 105 receives a system management interrupt (SMI) which causes the microprocessor to enter system management mode (SMM). The conditions under which an SMI is generated are discussed subsequently.

Figure 3:
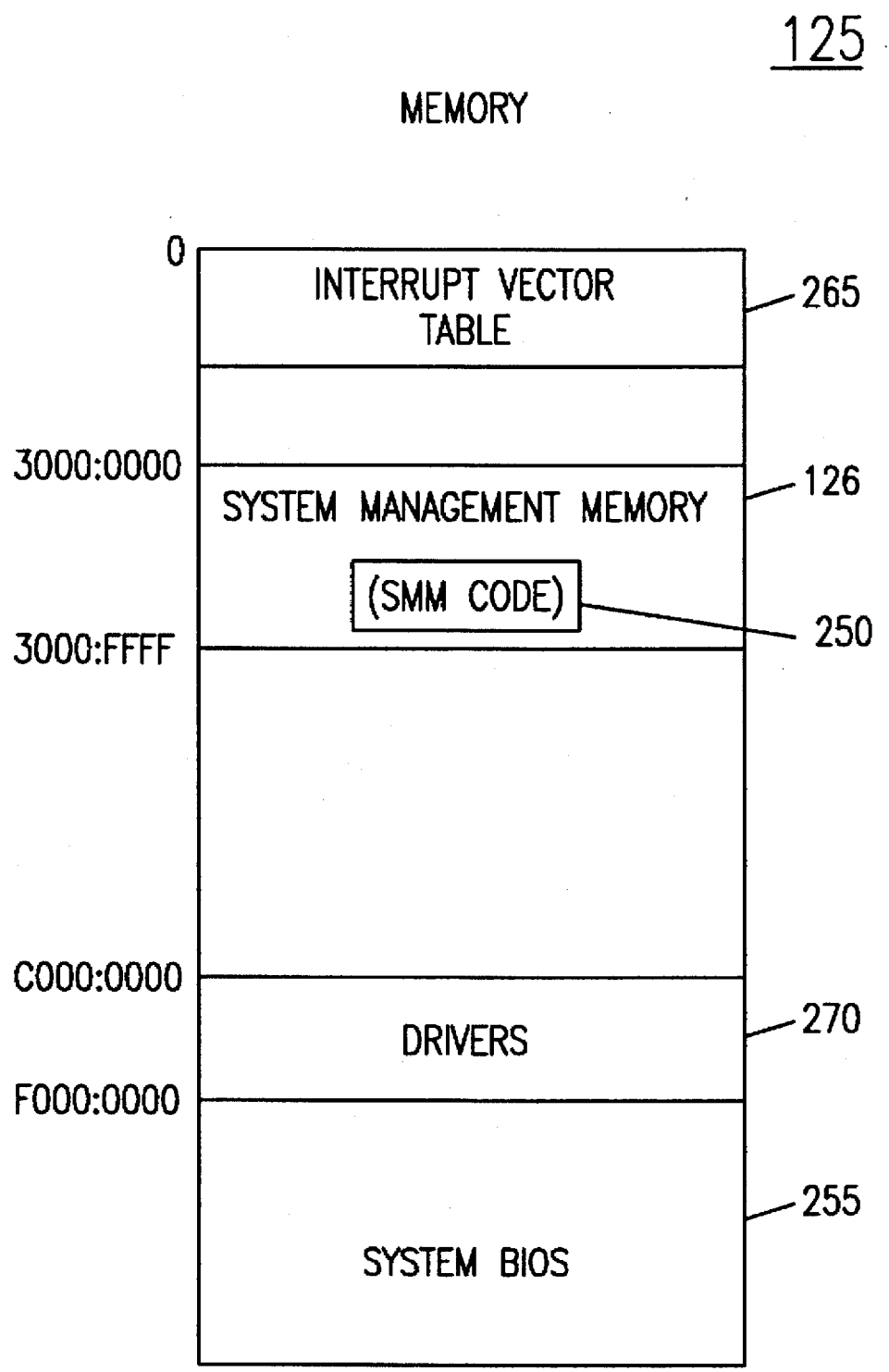
FIG. 3 is a representation of the main system memory of the computer system of FIG. 1.

In more detail, the system management mode (SMM) code 250 is stored in system management mode memory area 126 as shown in FIG. 3 In this particular embodiment, SMM memory area 126 resides between system memory addresses 3000:0000 and 3000:FFFF of system memory 125 whenever SMM is active. Also stored in system memory 125 are an interrupt vector table 265 which is part of the system BIOS, drivers 270, and the remainder of the system BIOS 255. Memory areas not otherwise designated in system memory 125 of FIG. 3 are available for the operating system and user application programs.

With the system BIOS 255 thus copied into system memory 125, the power-on-self-test module of BIOS executes to commence initialization of computer 100 as per block 300. Rather than turning on I/O ports such as serial port 190 and parallel port 185 at this time, these ports are intentionally left off or powered down as per block 305. At this point, BIOS issues a system management interrupt (SMI) which causes microprocessor 105 to enter the system management mode (SMM) as per block 310. Upon entering system management mode, I/O trapping of addresses within the range of addresses of the I/O ports is commenced as per block 315. This I/O trapping is implemented such that whenever an I/O activity occurs which specifies an I/O port device address within the address range associated the particular ports, then a system management interrupt (SMI) is issued. It is noted that I/O operations include I/O operations without data transfer, I/O operations with data transfer and initialization of a port.

Once I/O trapping has started, system management mode (SMM) is exited as per block 320 The operating system and applications software are now loaded as per block 325. Execution of the operating system and applications software code commences at block 330. A test is then conducted at decision block 335 to determine if a trap occurred during the execution of the operating system or an applications program. If a trap occurred at a particular instruction in the instruction stream, this signifies that the operating system or application program is attempting to conduct an I/O operation at a particular port. In other words, an I/O operation is being attempted within the range of addresses assigned to the I/O ports. When such an I/O operation is attempted, a trap occurs and in response a system management interrupt (SMI) is issued. System management mode is then entered as per block 340.

Once the microprocessor enters system management mode, the SMM code 250 stored in SMM memory 126 is executed starting at decision block 345. At decision block 345 a test is conducted to determine what type of I/O activity is being attempted by the I/O operation (I/O instruction) which caused the trap. If the attempted I/O operation is an initialization of the I/O port, then rather than writing the initialization parameters to the registers of the particular port, these initialization parameters are stored in SMM memory 126 as per block 350. The port remains off thus reducing the power consumed by the port.

If, for example, the particular port to which I/O activity is directed is a serial port such as serial port 190, then the initialization parameters for the registers of the serial port are stored in SMM memory 126. The registers and respective register addresses for a typical serial port are given below in TABLE 1.

TABLE 1

Serial Port Registers

| PORT ADDRESS OF REGISTER | REGISTER NAME |
| --- | --- |
| 3F8 | Receive buffer/transmit holding register |
| 3F9 | Interrupt enable register |
| 3FA | Interrupt identification register |
| 3FB | Line control register |
| 3FC | Modem control register |
| 3FD | Line status register |
| 3FE | Modem status register |

Similarly, if the particular I/O port to which an I/O operation is attempted is a parallel port 195 or other port (a PCMCIA port 170, for example), the initialization parameters for such other port are also stored in SMM memory 126 and that port remains off.

After the initialization parameters (register contents) are stored away in SMM memory, the microprocessor exits system management mode as per block 355. The microprocessor then returns to the operating system or applications program and continues execution as per block 360. Blocks 350, 355 and 360 form a routine or module.

Returning to decision block 345, if the attempted I/O operation is not an initialization, but rather is an I/O operation not involving actual data transfer through the port, then the requested I/O operation is emulated as per block 362. For example, one I/O operation which does not involve actual data transfer through a port is a request for the status (line status, modem status) of the port. In this instance, to emulate the I/O operation, rather than turning on the port and accessing status information from the port, the port remains off. Instead of turning on the port, the status information is read from SMM memory 126 as one or more of the initialization parameters which were earlier stored therein.

Another example of an I/O activity which does not require the actual transfer of data through the port is a change of baud rate for an I/O device coupled to the port. More particularly, a command such as change baud rate from 9600 bps to 14,400 bps would be one such command. In this instance, when the "set baud rate to 14,400" is executed, a trap occurs and SMM is entered. SMM code 250 determines that this activity is an I/O operation without data transfer at block 345 and the I/O operation is then emulated as per block 362. The I/O operation is emulated as per known techniques.

Typically, emulation of an I/O operation involves the following five steps. First, the system traps a particular I/O instruction by monitoring for instructions involving the address range associated with the particular I/O device. Second, the system determines the particular I/O address involved in the requested I/O operation. Third, based on the determined I/O address, the system stores the operand value from the I/O operation to an address in memory associated with the determined I/O address. A stored operand thus results. The stored operand can be later retrieved as desired. Fourth, the instruction pointer of the computer system is advanced to the next instruction to be executed. Fifth, the computer system returns to the process that was running prior to when the I/O instruction was trapped.

A detailed example of emulation of an output I/O instruction (a write instruction) is now discussed. First, a trap occurs when a write I/O instruction to a particular I/O port is encountered in the instruction stream supplied to the microprocessor. It is assumed that the particular write instruction is of a type not involving actual data transfer through the I/O port. Such instructions will be emulated rather than executed. The microprocessor traps I/O operations to addresses associated with a particular I/O port, for example address 3F9. (It will be recalled that address 3F9 is the port address of the interrupt enable register of the serial port.) When the trap occurs, system management mode (SMM) is entered. The value in the AL register which would normally be transmitted to the port when the I/O operation is executed is instead stored in SMM memory as a variable, such as com_3F9, for example. The instruction pointer is then adjusted to point to the next instruction in the instruction stream. The microprocessor then returns to the process (application code or operating system code) that was running prior to entering system management mode and execution continues.

A detailed example of emulation of an input I/O instruction (a read instruction) is now discussed. It is assumed that the particular read instruction is of a type not involving actual data transfer through the I/O port. Such instructions will be emulated rather than executed. A trap occurs when a read I/O instruction to a particular I/O port is encountered in the instruction stream supplied to the microprocessor. The microprocessor traps I/O operations to the address associated with a particular I/O port, for example address 3F9. When the trap occurs, system management mode (SMM) is entered. The value in the AL register which would normally be read from the I/O port when the I/O operation is executed is instead retrieved from SMM memory as a variable, such as com_3F9, for example. In this particular example, the value of com_3F9 was previously stored in SMM memory and represent an initialization parameter which was earlier stored in SMM memory such as per block 350 in the flow chart of FIG. 2. The instruction pointer is then adjusted to point to the next instruction in the instruction stream. The microprocessor then returns to the process (application code or operating system code) that was running prior to entering system management mode. An example of one operating system which as capable of emulating I/O operations is Microsoft Windows. After emulation step 362, any parameters that are changed as a result of the emulated I/O operation are stored in SMM memory.

After the requested I/O operation is emulated at block 362, system management mode is exited at block 365. Process flow then continues back to the operating system or the applications program and the requested I/O operation is skipped by the operating system or applications program as per block 370. The operating system and application program then continue to execute as per block 330. Blocks 362, 365 and 370 form a routine or module.

Returning again to decision block 345, if the requested I/O operation which caused the trap is an I/O operation which requires an actual data transfer, then the I/O port associated with the requested operation is turned on and the initialization parameters which were stored in SMM memory for this port are loaded into the port as per block 375. System management mode (SMM) is exited as per block 380.

With the port thus initialized and powered-up, a real I/O operation (ie. non-emulated operation) is performed as per block 385.

After the requested I/O operation is actually performed at block 380, system management mode is exited at block 385. Process flow then continues back to the operating system or the applications program as per block 390. The operating system and application program then continue to execute as per block 330. Blocks 375, 380, 385 and 390 form a routine or module.

Since SMM code 250 is stored in SMM memory 126, this code is not reachable by the user, by the applications program or by the operating system. This feature advantageously provides security against undesired intentional malicious tampering and security against the unintentional effects of ill-behaved software. Since the SMM code executes out of SMM memory 126, the SMM code is operating system independent. In other words, the SMM code will operate regardless of the particular operating system installed on the computer. Thus, the SMM code need not be rewritten for each operating system employed on the computer.

While a computer apparatus including an I/O port power management feature is described above, it is clear that a method of managing I/O port power is also disclosed. More particularly, the method includes the step of maintaining the I/O port of the computer in an off state when the computer is initialized. The method also includes the step of trapping I/O operations to the I/O port. The method further includes the step of keeping the I/O port in the off state until an I/O operation is trapped which involves an actual data transfer through the I/O port. The method still further includes the step of turning the I/O port on to a powered-up state when an I/O operation is trapped which involves an actual data transfer through the I/O port.

Another embodiment of the disclosed method of managing I/O port power includes the step of maintaining the I/O port of a computer in an off state when the computer is initialized. The method also includes the steps of trapping an I/O operation to the I/O port and checking the I/O type of the I/O operation. The method further includes the step of saving initialization parameters for the I/O port to a system management mode (SMM) memory as stored initialization parameters if the I/O type of the I/O operation is a port initialization. The method still further includes the step of emulating the I/O operation if the I/O type is that of an I/O activity without data transfer through the port, the I/O port remaining in the off state during the emulating step. The method also includes the step of turning the I/O port on to a powered-up state if the I/O type is that of an I/O activity with data transfer through the port.

The foregoing has described a computer apparatus and methodology which reduces power consumption by the I/O ports of a computer to conserve energy. This feature is most important in portable computers. Advantageously, the disclosed methodology for reducing power consumption by the I/O ports of the computer is operating system independent. In this manner, the power management technique functions correctly regardless of which particular operating system or application software is installed on the computer.

While only certain preferred features of the invention have been shown by way of illustration, many modifications and changes will occur. For example, while the particular embodiment discussed above involved power consumption reduction by serial ports, parallel ports and PCMCIA ports, the technique applies to other ports and devices as well. For example, the technique can also be applied to other devices and controllers which are initialized and which store initialization parameters, such as disk controllers and disk drives, for example. It is, therefore, to be understood that the present claims are intended to cover all such modifications and changes which fall within the true spirit of the invention.

I claim:

1. A computer system comprising:
   an I/O port;
   a processor, coupled to the I/O port, for executing instructions in an instruction stream provided to the processor, the processor trapping I/O operations to the I/O port to produce trapped I/O operations; and
   a memory, coupled to the processor, the memory including code which when executed by the processor leaves the I/O port in a powered-off state until a trapped I/O operation involving actual data transfer through the I/O port is executed by the processor.

2. The computer system of claim 1 wherein the port is a serial port.

3. The computer system of claim 1 wherein the port is a parallel port.

4. The computer system of claim 1 wherein the port is a PCMCIA port.

5. A computer system comprising:
   an I/O port;
   a processor, coupled to the I/O port, for executing instructions in an instruction stream provided to the processor, the processor trapping I/O operations to the I/O port to produce trapped I/O operations;
   a main memory coupled to the processor, the main memory including a system management mode (SMM) memory, the SMM memory including SMM code for checking trapped I/O operations to determine the types of the trapped I/O operations, the SMM code including:
      a first module for saving initialization parameters for the I/O port to the system management mode (SMM) memory as stored initialization parameters if the I/O type of a trapped I/O operation is a port initialization;
      a second module for emulating a trapped I/O operation if the I/O type of the trapped I/O operation is a type without data transfer through the port, the I/O port remaining in the off state during the emulating of the trapped I/O operation;
      a third module for turning the I/O port on to a powered-up state if the I/O type of the trapped I/O operation is a type with data transfer through the port.

6. The computer system of claim 5 wherein the port is a serial port.

7. The computer system of claim 5 wherein the port is a parallel port.

8. The computer system of claim 5 wherein the port is a PCMCIA port.

9. A computer system comprising:
   an I/O port;
   a processor, coupled to the I/O port, for executing operations in an operation stream provided thereto, the processor trapping I/O operations to the I/O port to produce trapped I/O operations;
   a main memory coupled to processor, the main memory including a system management mode (SMM) memory;
   a non-volatile memory, coupled to the main memory, for storing system management (SMM) code for checking trapped I/O operations to determine the types of trapped I/O operations, the SMM code being loaded into the system memory for execution by the processor, the SMM code including:
      a first module for saving initialization parameters for the I/O port to the system management mode (SMM) memory as stored initialization parameters if the I/O type of a trapped I/O operation is a port initialization;
      a second module for emulating a trapped I/O operation if the I/O type of the trapped I/O operation is a type without data transfer through the port, the I/O port remaining in the off state during the emulating of the trapped I/O operation;
      a third module for turning the I/O port on to a powered-up state if the I/O type of the trapped I/O operation is a type with data transfer through the port.

10. The computer system of claim 9 wherein the non-volatile memory comprises a FLASH memory.

11. The computer system of claim 9 wherein the port is a serial port.

12. The computer system of claim 9 wherein the port is a parallel port.

13. The computer system of claim 9 wherein the port is a PCMCIA port.

14. A method of operating a computer including an I/O port comprising the steps of:
   maintaining the I/O port in an off state when the computer is initialized;
   trapping I/O operations to the I/O port;
   keeping the I/O port in the off state until an I/O operation is trapped which involves an actual data transfer through the I/O port; and
   turning the I/O port on to a powered-up state when an I/O operation is trapped which involves an actual data transfer through the I/O port.

15. A method of operating a computer including an I/O port comprising the steps of:
   maintaining the I/O port in an off state when the computer is initialized;
   trapping an I/O operation to the I/O port;
   checking the I/O type of the I/O operation;
   saving initialization parameters for the I/O port to a system management mode (SMM) memory as stored initialization parameters if the I/O type of the I/O operation is an I/O port initialization;
   emulating the I/O operation if the I/O type is that of an I/O activity without data transfer through the port, the I/O port remaining in the off state during the emulating step; and
   turning the I/O port on to a powered-up state if the I/O type is that of an I/O activity with data transfer through the I/O port.

16. The method of claim 15 wherein the power conserving state is the off state of the I/O port.

17. The method of claim 16 wherein the turning step includes loading the stored initialization parameters into the I/O port.

18. The method of claim 17 wherein the turning step includes performing an I/O operation of a type with data transfer through the port.

19. The method of claim 15 wherein the trapping step includes:
   issuing a system management interrupt when the computer is turned on;
   entering a system management mode (SMM) by the computer;
   initiating monitoring for a range of addresses associated with the I/O port; and
   exiting system management mode (SMM).

20. The method of claim 15 further comprising the step of issuing a system management interrupt (SMI) when a trap occurs in the trapping step.

21. The method of claim 15 further comprising the step of entering the system management mode (SMM) after the trapping step.

22. The method of claim 21 further comprising the step of exiting the system management mode (SMM) after the saving step.

23. The method of claim 21 further comprising the step of exiting the system management mode (SMM) after the emulating step.

24. The method of claim 21 further comprising the step of exiting the system management mode (SMM) after the turning step.

25. A method of operating a computer including an I/O port comprising the steps of:

maintaining the I/O port in an off state when the computer is initialized;

trapping an I/O operation within an address range assigned to the I/O port thus producing a trapped I/O operation;

entering system management mode by the computer when a trapped I/O operation occurs;

checking the I/O type of the trapped I/O operation; and if the I/O type of the trapped I/O operation is as I/O port initialization and the trapped I/O operation includes initialization parameters, then saving the initialization parameters for the I/O port to a system management mode (SMM) memory as stored initialization parameters;

if the I/O type of the trapped I/O operation is that of an I/O activity without data transfer through the I/O port, then emulating the trapped I/O operation, the I/O port remaining in a power conserving state during this emulating step;

if the I/O type of the trapped I/O operation is that of an I/O activity with data transfer through the port, then turning the I/O port on to a powered-up state.

26. The method of claim 25 wherein the power conserving state is a no power state.

27. The method of claim 25 wherein the turning step includes loading the stored initialization parameters into the I/O port.

28. The method of claim 25 further comprising the step of performing an I/O operation of a type with data transfer through the port when the port is turned on to a powered-up state.

29. The method of claim 25 wherein the trapping step includes:

issuing a system management interrupt when the computer is turned on;

entering a system management mode (SMM) by the computer;

initiating monitoring for a range of addresses associated with the I/O port; and exiting system management mode (SMM).

30. The method of claim 25 further comprising the step of issuing a system management interrupt (SMI) when a trap occurs in the trapping step.

31. The method of claim 25 further comprising the step of exiting the system management mode (SMM) after saving the initialization parameters for the I/O port to a system management mode (SMM) memory as stored initialization parameters.

32. The method of claim 25 further comprising the step of exiting the system management mode (SMM) after emulating the I/O operation.

33. The method of claim 25 further comprising the step of exiting the system management mode (SMM) after turning the I/O port on to a powered-up state.

* * * * *